US007364505B2

(12) United States Patent
Mattice et al.

(10) Patent No.: US 7,364,505 B2
(45) Date of Patent: Apr. 29, 2008

(54) METHOD AND APPARATUS FOR PLAYER STIMULATION

(75) Inventors: Harold E. Mattice, Gardnerville, NV (US); Richard L. Wilder, Sparks, NV (US); Joseph R. Hedrick, Reno, NV (US); William Wells, Reno, NV (US)

(73) Assignee: IGT, Reno, NV (US)

( * ) Notice: Subject to any disclaimer, the term of this patent is extended or adjusted under 35 U.S.C. 154(b) by 509 days.

(21) Appl. No.: 10/244,772

(22) Filed: Sep. 16, 2002

(65) Prior Publication Data

US 2004/0053695 A1 Mar. 18, 2004

(51) Int. Cl.

| | |
|---|---|
| ***A63F 9/24*** | (2006.01) |
| ***A63F 13/00*** | (2006.01) |
| ***A63B 71/00*** | (2006.01) |
| ***G06F 17/00*** | (2006.01) |
| ***G06F 19/00*** | (2006.01) |

(52) U.S. Cl. ............................ 463/16; 463/17; 463/22; 463/46; 273/138.1

(58) Field of Classification Search .................. 463/42, 463/1–22, 25–35, 40, 43, 46; 273/138.1, 273/139, 138.2, 460

See application file for complete search history.

(56) References Cited

U.S. PATENT DOCUMENTS

| | | | | |
|---|---|---|---|---|
| 3,785,721 | A * | 1/1974 | Harsch | 349/33 |
| 4,121,119 | A * | 10/1978 | Meigs et al. | 327/59 |
| 4,457,203 | A * | 7/1984 | Schoenberg et al. | 84/454 |
| 5,334,841 | A * | 8/1994 | Graessle et al. | 250/458.1 |
| 6,043,615 | A | 3/2000 | Forbes | 315/291 |
| 6,110,040 | A * | 8/2000 | Sanduski et al. | 463/13 |
| 6,270,412 | B1 * | 8/2001 | Crawford et al. | 463/20 |
| 6,309,301 | B1 | 10/2001 | Sano | 463/35 |
| 2003/0109304 | A1 * | 6/2003 | Gauselmann | 463/30 |

FOREIGN PATENT DOCUMENTS

| | | |
|---|---|---|
| CA | 2 377 620 | 9/2002 |
| JP | 2000-296209 | * 10/2000 |
| WO | WO 98/59524 | * 12/1998 |

OTHER PUBLICATIONS

Inexpensive Peak Detector Features Droopless Operation, Maxim (Jan. 26, 2001).

* cited by examiner

*Primary Examiner*—Robert E. Pezzuto
*Assistant Examiner*—Binh-An D. Nguyen
(74) *Attorney, Agent, or Firm*—Weaver Austin Villeneuve & Sampson LLP

(57) ABSTRACT

A gaming apparatus includes a value input device, a display unit that is capable of generating video images, a light array, an audio output device, and a controller operatively coupled to said value input device, said display unit, said light array and said audio output device, said controller including a processor and a memory operatively coupled to said processor. The controller is programmed to allow a person to make a wager, to cause a video image representing a game to be generated on said display unit, to determine a game event mode, to selectively perform one of: (i) to cause a sound segment to be generated on said audio output device and synchronize a light pattern to be generated on said light array with the sound segment and (ii) to control said light array directly to cause a light pattern to be generated on said light array according to the game event mode, and to determine a value payout associated with an outcome of said game.

2 Claims, 17 Drawing Sheets

FIG. 10
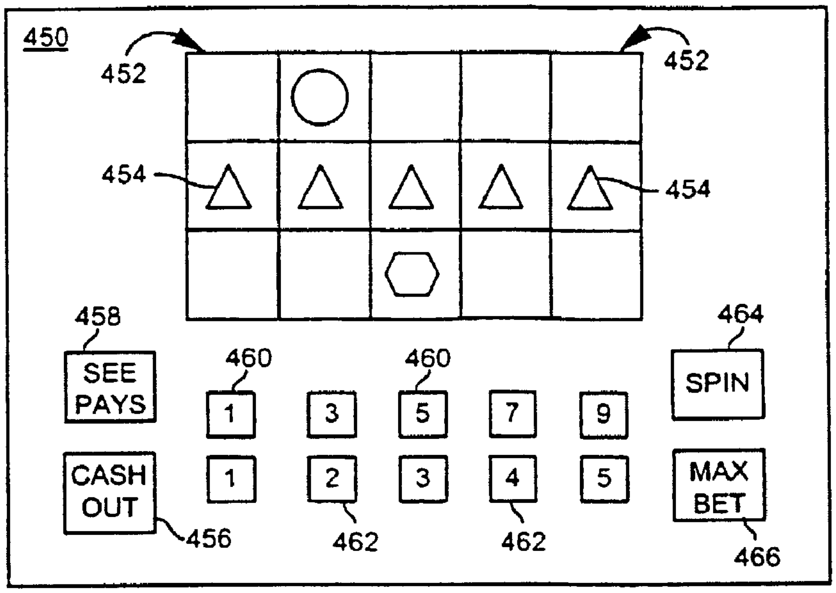
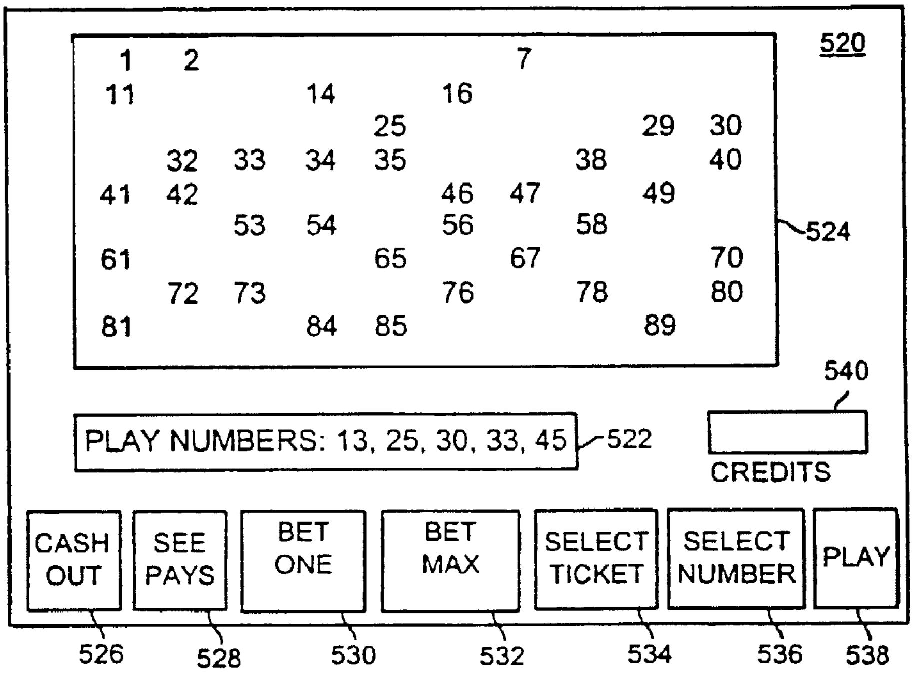
FIG. 11

METHOD AND APPARATUS FOR PLAYER STIMULATION

BACKGROUND

The present disclosure is directed to a method and apparatus for player stimulation, and, in particular, a method and apparatus for player sensory stimulation.

U.S. Pat. No. 6,043,615 states that it shows a gaming device that operates one or more fluorescent illumination lamps to signal promotional operation of the device. The '615 Patent states that the fluorescent lamps are used to illuminate decorative glass panels. The '615 Patent also states that the fluorescent lamps operate in a flashing mode or a dimming mode. The '615 Patent further states that the promotional operation may include a bonus condition.

U.S. Pat. No. 6,309,301 states that it shows a synchronized sound track system, i.e., synchronizing sounds and/or music with game play. The '301 Patent states that the synchronization may occur at one gaming apparatus, or among a system of connected gaming apparatuses.

BRIEF DESCRIPTION OF THE DRAWINGS

FIG. 10 is an illustration of an embodiment of a visual display that may be displayed during performance of the slots routine of FIG. 12;

FIG. 11 is an illustration of an embodiment of a visual display that may be displayed during performance of the video keno routine of FIG. 13;

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
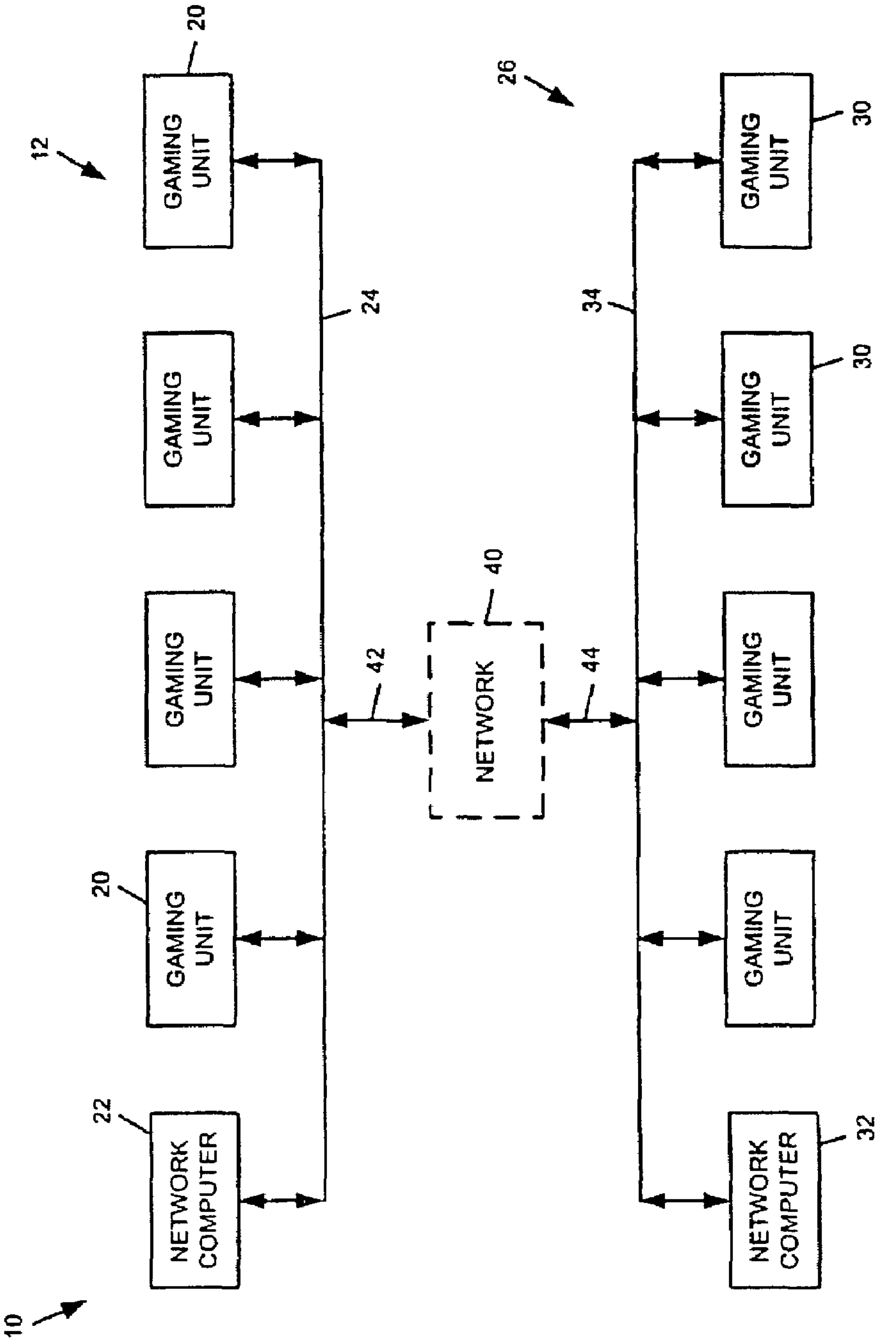
FIG. 1 is a block diagram of an embodiment of a gaming system in accordance with the invention.

FIG. 1 illustrates one possible embodiment of a casino gaming system 10 in accordance with the invention. Referring to FIG. 1, the casino gaming system 10 may include a first group or network 12 of casino gaming units 20 operatively coupled to a network computer 22 via a network data link or bus 24. The casino gaming system 10 may include a second group or network 26 of casino gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44.

The first network 12 of gaming units 20 may be provided in a first casino, and the second network 26 of gaming units 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may provided as a dedicated hardwired link or a wireless link. Although the data link 24 is shown as a single data link 24, the data link 24 may comprise multiple data links.

Figure 2:
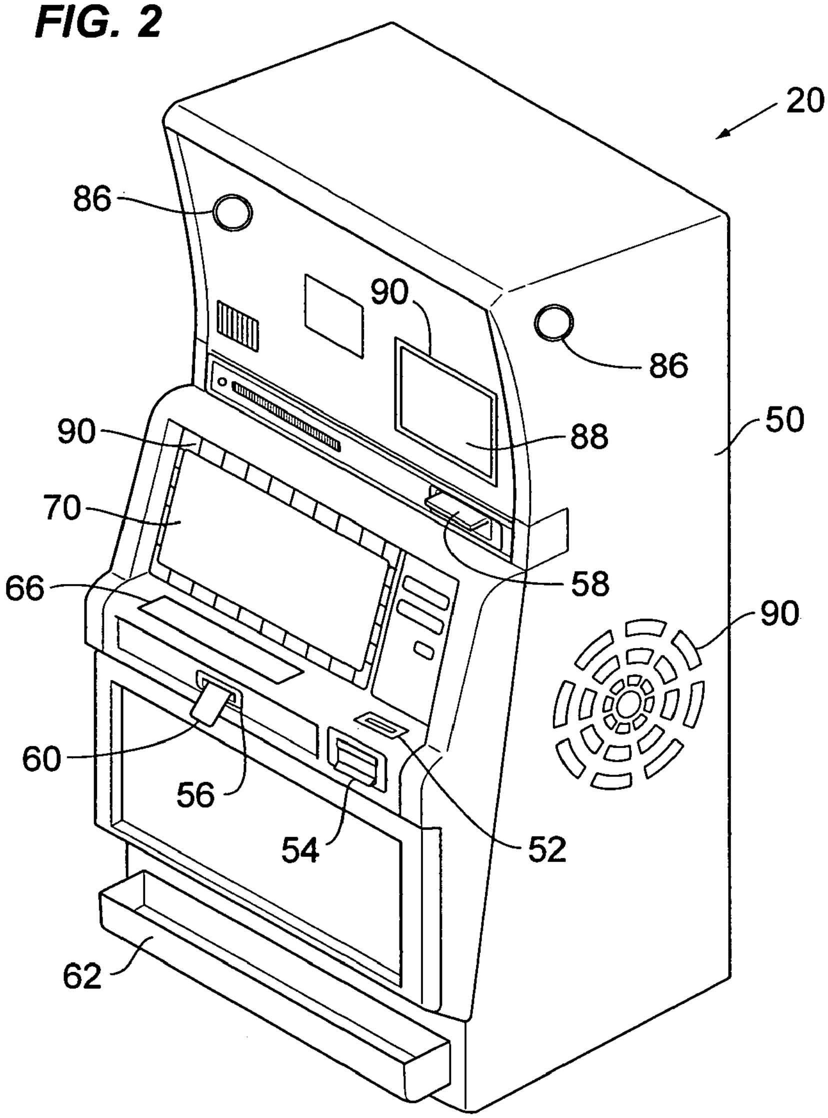
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of casino gaming unit and may have various different structures and methods of operation. For exemplary purposes, various designs of the gaming units 20 are described below, but it should be understood that numerous other designs may be utilized.

Referring to FIG. 2, the casino gaming unit 20 may include a housing or cabinet 50 and one or more input devices, which may include a coin slot or acceptor 52, a paper currency acceptor 54, a ticket reader/printer 56 and a card reader 58, which may be used to input value to the gaming unit 20. A value input device may include any device that can accept value from a customer. As used herein, the term "value" may encompass gaming tokens, coins, paper currency, ticket vouchers, credit or debit cards, smart cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card. If provided for player tracking purposes, the card reader 58 may be used to read data from, and/or to write data to, player tracking cards that are capable of storing data representing the identity of a player, the identity of a casino, the player's gaming habits, etc. The card reader 58 may also be used to read data from, and/or to write data to, a card that is capable of storing data representing value awarded to the player based on game play for later use or redemption.

The gaming unit 20 may include value output devices other than the ticket reader/printer 56 and card reader 58. For example, the gaming unit 20 may include one or more hoppers (not shown) mounted in the housing 50. The one or more hoppers may dispense value into a tray 62 disposed at the front of the housing 50. The value may be in the form of coins or tokens, or may be in the form of tangible items, such as jewelry, game play tickets or tokens, merchandise tickets or tokens, restaurant tickets or tokens, show tickets or tokens or the like, disposed in a capsule or cover.

Figure 2A:
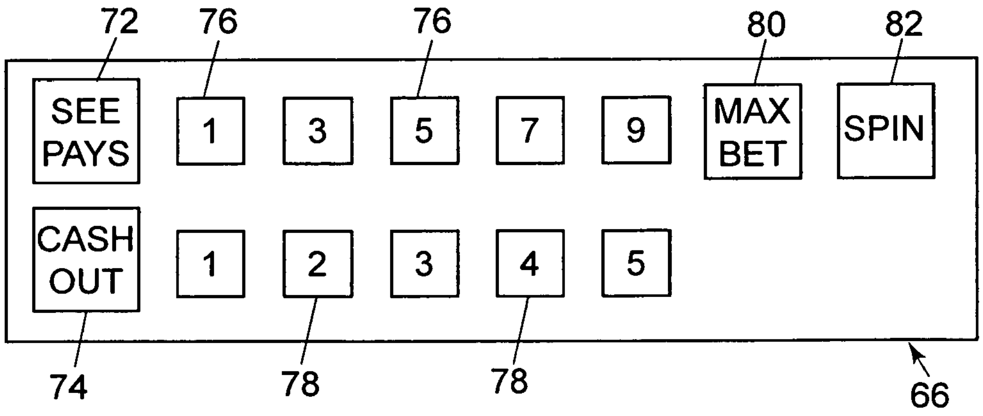
FIG. 2A illustrates an embodiment of a control panel for a gaming unit.

The gaming unit 20 may also include an input control panel 66. The input control panel 66 may be provided with a plurality of pushbuttons or touch sensitive areas that may be pressed by a player to select games, make wagers, make gaming decisions, etc. FIG. 2A illustrates one possible embodiment of the control panel 66, which may be used where the gaming unit 20 is a slot machine having a video output device in the form of a color video display unit 70 for displaying images of slot machine reels. While such an example is discussed herein, the gaming unit 20 is not limited to slot machines with video display unit outputs, but may include other forms of machines with video display unit outputs (e.g., video poker machines) or other forms of slot machines (e.g., slot machines with mechanical reels).

Turning now to FIG. 2A, the control panel 66 may include a "See Pays" button 72 that, when activated, causes the display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray 62.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slots game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 2A, a rectangle is shown around the buttons 72, 74, 76, 78, 80, 82. It should be understood that rectangle simply designates, for ease of reference, an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. Although the control panel 66 is shown to be separate from the display unit 70, it should be understood that the control panel 66 could be generated by the display unit 70. In that case, each of the buttons of the control panel 66 could be a colored area generated by the display unit 70, and some type of mechanism may be associated with the display unit 70 to detect when each of the buttons was touched, such as a touch-sensitive screen or touch-sensitive pads.

The gaming unit 20 may include one or more audio output devices 86. The audio output devices 86 may be speakers, and may be capable of providing sounds that emanate or appear to emanate from a single point, that emanate or appear to emanate from multiple points, or that vary or appear to vary their point of emanation in two dimensional or three dimensional space. Other types of audio output devices 86 may include whistles, buzzers, bells, chimes, horns, etc. The audio output devices 86 may generate audio sound segments representing sounds such as the noise of spinning slot machine reels, a dealer's voice, music, announcements, etc.

The gaming unit 20 may further include one or more video output devices 88. The video output device 88 may be color video display unit, like the video output device 70. In a gaming unit where the video output devices 70, 88 are video display units, the video display unit 70 may be described as the primary video display unit, while the video output device 88 may be described as the secondary video display unit. The video output device 88 may be used to display information about the game content of the gaming unit 20, or may be used as part of a secondary or bonus game.

Additionally, the gaming unit 20 may include one or more light arrays 90. The light arrays 90 may include a single illumination device, such as a border around the video output display 88, or a plurality of illumination devices, such as a segmented border around the display unit 70 or a starburst pattern on the side of the housing 50. Where the buttons 72, 74, 76, 78, 80, 82 of the control panel 66 are pushbuttons that are in whole or in part transparent or translucent, the light array 90 may include a plurality of an illumination devices, one or more of the illumination devices disposed behind a different one of the buttons 72, 74, 76, 78, 80, 82.

The light arrays 90 may include one or more electroluminescent devices, bulbs or LEDs. Alternatively, one or more light guides, such as fiber optic cables, may be used to transmit light from a remotely located source disposed within the housing 50. The devices, bulbs, LEDs, light guides, etc. may illuminate, for example, a pushbutton or touch-sensitive region with light of a single color, or may illuminate the pushbutton or touch-sensitive region with light of many different colors. Alternatively, the bulbs, LEDs, light guides, etc. may provide light that is altered, for example, by passing the light through a cover that is tinted, whether in whole or in part, or by passing the light of a broader spectrum through one or more filters.

The light array 90 may include light bezels, strips of lights, illuminated panels, etc. Where the light array 90 may include more than one illumination device, the devices that make up the array 90 may be grouped into patterns, or distributed uniformly or randomly on the surface of the cabinet 50. The array 90 may also include mechanisms that cause the bulbs, LEDs, etc. to move or to appear to move. For example, the array 90 may include moving or rotating platforms, mirrors or lenses.

Gaming Unit Electronics

Figure 3:
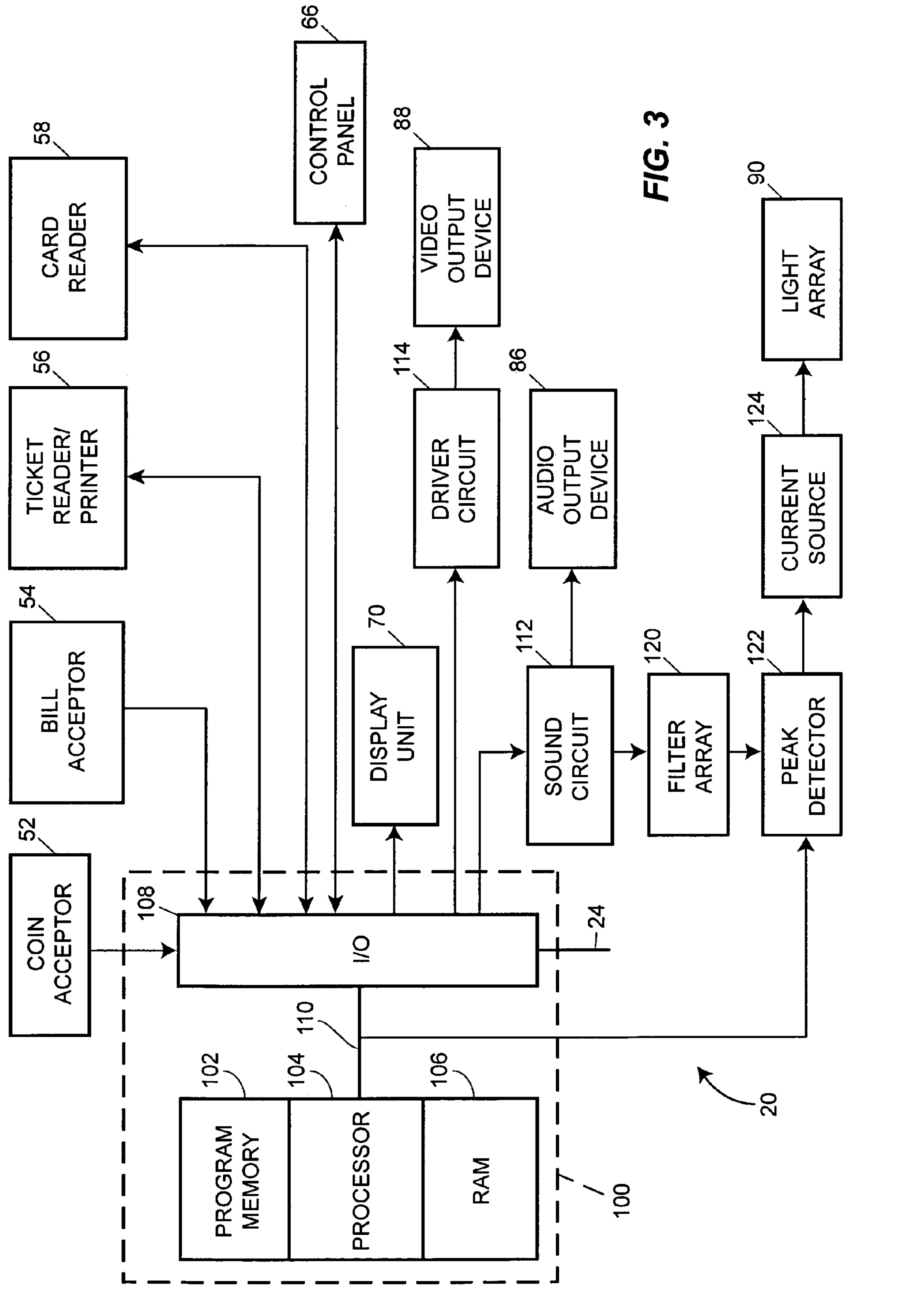
FIG. 3 is a block diagram of the electronic components of the gaming unit of FIG. 2.

FIG. 3 is a block diagram of a number of components that may be incorporated in the gaming unit 20. Referring to FIG. 3, the gaming unit 20 may include a controller 100 that may comprise a program memory 102, a microcontroller or microprocessor (MP) 104, a random-access memory (RAM, NOVRAM, etc.) 106 and an input/output (I/O) circuit 108. While the processor 104 and the memories 102, 106 are shown as a single unit, connected to the I/O circuit 108 via an address/data bus 110, the processor 104 and memories 102, 106 may be separated and connected to each other through the bus 110.

It should also be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memories 102 may be implemented as semiconductor memories, magnetically readable memories, and/or optically readable memories, for example.

The program memory 102 shown in FIG. 3 may be a read-only memory (ROM) 102. Alternatively, the program memory 102 may be a read/write or alterable memory, such as a hard disk. In the event a hard disk is used as a program memory, the address/data bus 110 shown schematically in FIG. 3 may comprise multiple address/data buses, which may be of different types, and there may be an I/O circuit disposed between the address/data buses. As a further alternative, the program memory 102 may include programmable read-only memory (PROM), erasable programmable read-only memory (EPROM), etc.

FIG. 3 illustrates that the coin acceptor 52, the bill acceptor 54, the ticket reader/printer 56, the card reader 58, the control panel 66, the display unit 70, the audio output device 86 and the video output device 88 may be operatively coupled to the I/O circuit 108, each of those components being so coupled by either a unidirectional or bidirectional, single line or multiple line data link, which may depend on the design of the component that is used. The audio output device 86 may be operatively coupled to a sound circuit 112, that may comprise a voice and sound synthesis circuit or that may comprise a driver circuit. The sound generating circuit 112 may be coupled to the I/O circuit 108. Similarly, the video output devices 88 may be operatively coupled to a driver circuit 114.

As shown in FIG. 3, the components 52, 54, 56, 58, 66, 70, 112, 114 may be connected to the I/O circuit 108 via a respective direct line or conductor. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108.

For example, as shown in the lower portion of FIG. 3, the light array 90 may be coupled to the processor 104 without passing through the I/O circuit 108. In fact, the light array 90 may be coupled to the microprocessor 104 and the sound circuit 112. In particular, the sound circuit 112 may be coupled to a filter array 120 (which may include analog, digital, etc. low pass, high pass, band pass, and/or band reject filters) that may in turn be coupled to a peak detector 122. The microprocessor 104 may also be coupled to the peak detector 122. The peak detector 122 may be coupled to a current source 124, and the current source 124 may be coupled to the light array 90. Thus, either the microprocessor 104 or the sound circuit 112 may control the light array 90 via operation of the peak detector 122.

Figure 3A:
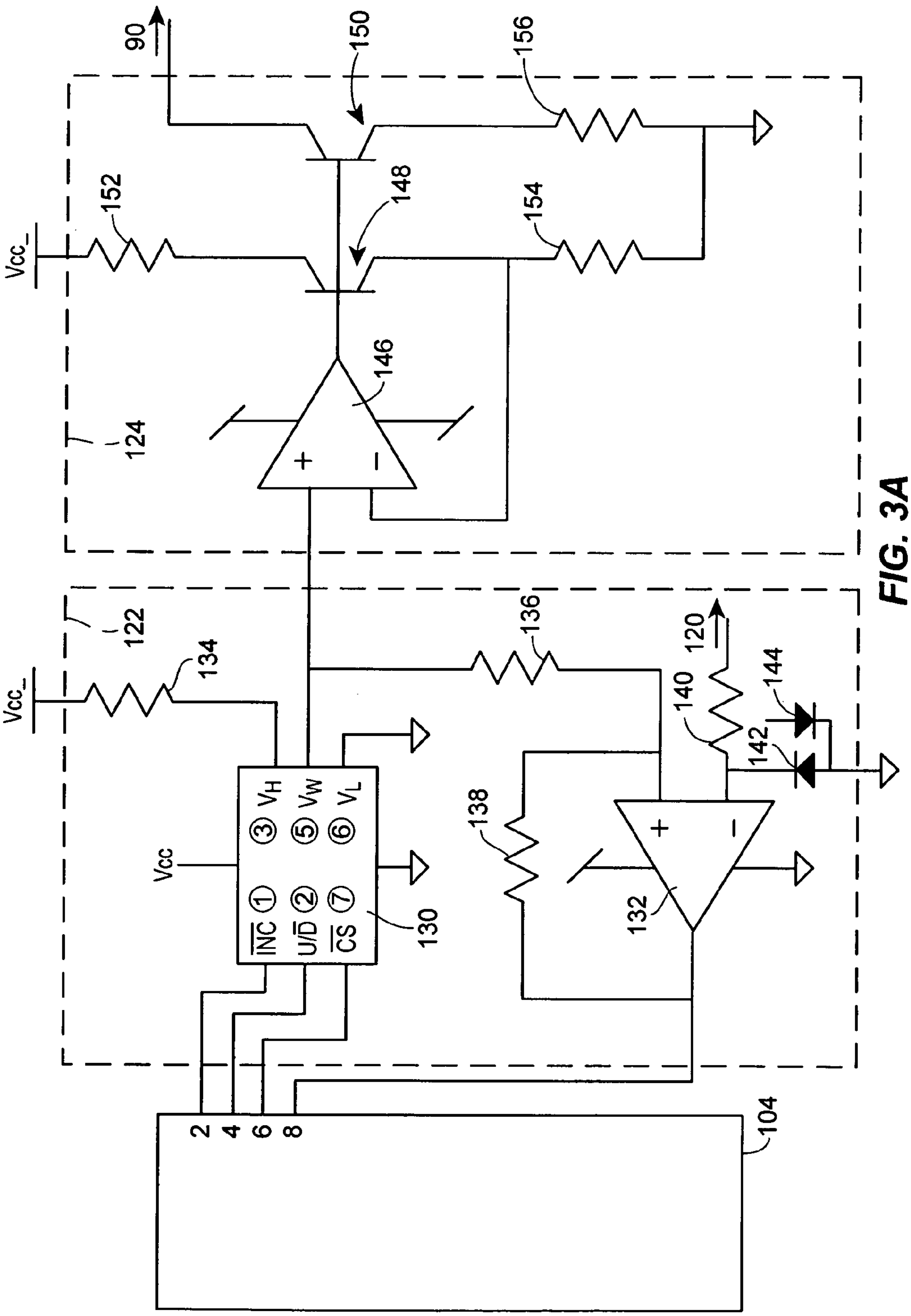
FIG. 3A is a circuit schematic of certain of the electrical components shown in the block diagram of FIG. 3.

FIG. 3A shows an exemplary embodiment of the circuitry of the microprocessor 104, the peak detector 122 and the current source 124. The microprocessor 104 may be a 89C51RD2 microprocessor manufactured by Phillips Semiconductors of Sunnyvale, Calif. Such a microprocessor 104 has the program memory 102 and RAM 106 on-board, which minimizes the number of external components used. The peak detector 122 may include a 5-bit digital potentiometer 130, a comparator 132, resistors 134, 136, 138, 140, and diodes 142, 144. The digital potentiometer 130 may be a MAX 5160 digital potentiometer manufactured by Maxim Integrated Products Inc. of Sunnyvale, Calif., and the comparator may be an LM339 comparator. The current source 124 may include an operational amplifier 146, two transistors 148, 150, and three resistors 152, 154, 156. The operational amplifier, or op-amp, 146 may be an LM324 device. This embodiment is provided for purposes of illustration only, and is not intended to limit the scope of the claims thereby.

The microprocessor 104, the peak detector 122, and the current source 124, may be coupled together in the following manner.

Pin 2 of the microprocessor 104 may be coupled to pin 1 of the digital potentiometer 130 Similarly, pin 4 of the microprocessor 104 may be coupled to pin 2 of the digital potentiometer 130, and pin 6 of the microprocessor 104 may be coupled to pin 7 of the digital potentiometer 130. Pin 3 of the digital potentiometer 130 may be coupled to the voltage source $V_{CC}$ via the resistor 134, and pin 6 of the digital potentiometer 130 may be coupled to ground.

Pin 5 of the digital potentiometer 130 may be coupled to the positive input of the comparator 132 via the resistor 136. The positive input of the comparator 132 may also be coupled to the output of the comparator 132 via a resistor 138 to provide positive feedback and hysteresis, although this arrangement is optional. The negative input to the comparator 132 may be coupled via resistor 140 to the filter array 120. Also coupled to the negative input of the comparator 132 may be the combination of diodes 142, 144. The output of the comparator 132 may be coupled to pin 8 of the microprocessor 104.

Pin 5 of the digital potentiamitor 130 may also be coupled to the non-inverting terminal of the operational amplifier 146. The output of the operational amplifier 146 may be coupled to the bases of the transistors 148, 150. The collector of the transistor 148 may be connected via the resistor 152 to $V_{CC}$, while the emitter of transistor 148 may be coupled via the resistor 154 to ground. The emitter of the transistor 148 may also be coupled to the inverting terminal of the operational amplifier 146. The collector of transitor 150 may be coupled to the light array 90, while the emitter may be coupled via the resistor 156 to ground.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portions may be written in any high level language such as C, C++, C#, Java, Visual Basic or the like or any low-level assembly or machine language. The computer program portions may be written in scripting languages, such as VBScript and JavaScript (or JScript). By storing the computer program portions therein, various portions of the memories 102, 106 are physically and/or structurally configured in accordance with computer program instructions.

Figure 4:
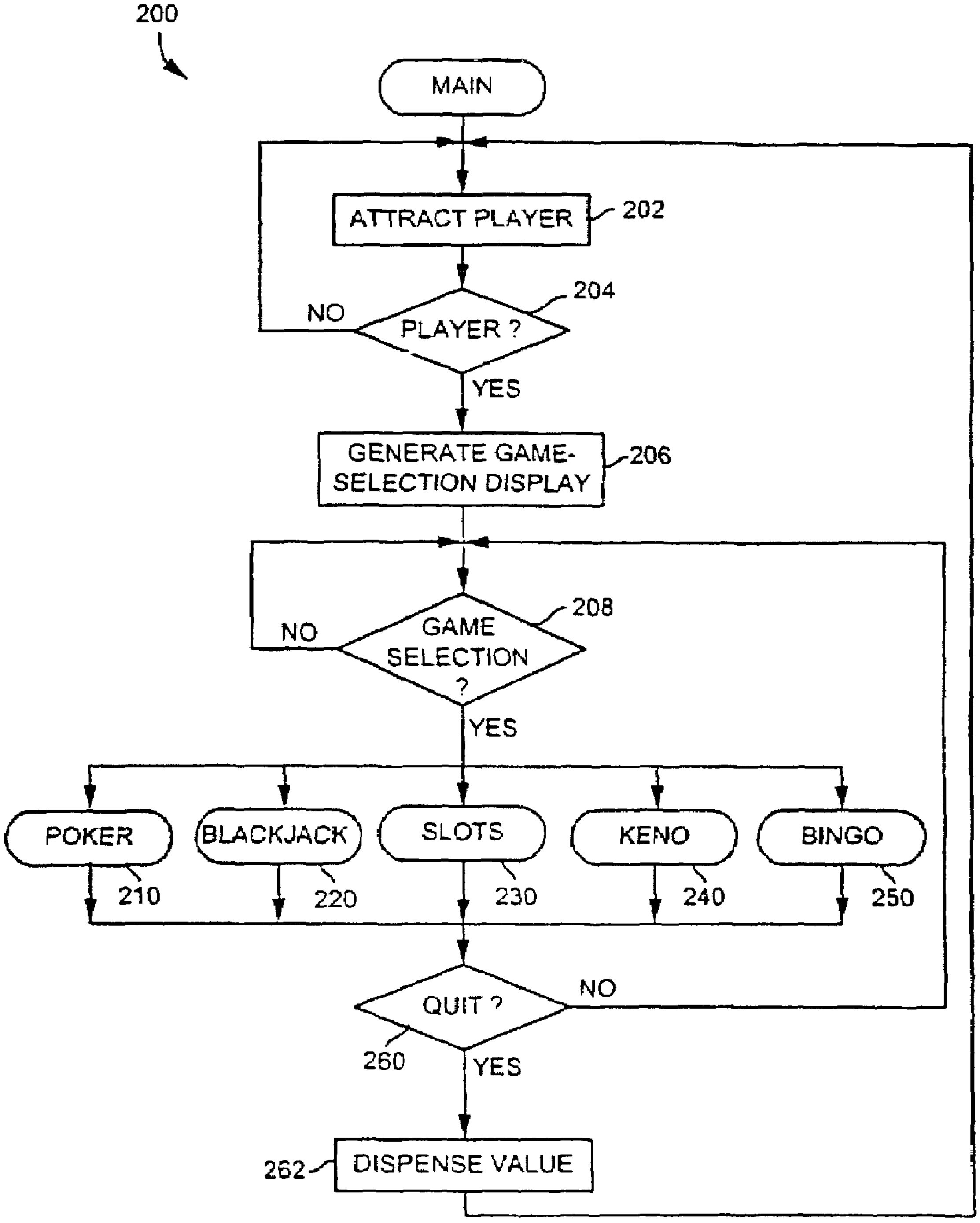
FIG. 4 is a flowchart of an embodiment of a main routine that may be performed during operation of one or more of the gaming units.

FIG. 4 is a flowchart of a main operating routine 200 that may be stored in the memory of the controller 100. Referring to FIG. 4, the main routine 200 may begin operation at block 202 during which an attraction sequence may be performed in an attempt to induce a potential player in a casino to play the gaming unit 20. The attraction sequence may be performed by displaying one or more video images on the display units 70, 88 and/or causing one or more sound segments, such as sound effects, voice or music, to be generated via the audio output devices 86. The attraction sequence may include a scrolling list of games that may be played on the gaming unit 20 and/or video images of various games being played, such as video poker, video blackjack, video slots, video keno, video bingo, etc.

The light array 90 may also be used during the attraction sequence. The light array 90 may illuminate on/off or dim in synchronization with the sound segments generated via the audio output devices 86 or in response to signals provided directly by the controller 100, as explained in greater detail below. In fact, the light array 90 may be synchronized to sound segments or controlled directly by the microprocessor 104 during any game play mode (e.g., attraction mode, normal play mode, bonus mode, jackpot mode, etc.). Alternatively, the light array 90 may be synchronized to sound segments or controlled directly by the microprocessor 104 independent of the game play mode (e.g., attraction mode, normal play mode, bonus mode, jackpot mode, etc.). As a further alternative, the light array 90 may be synchronized to sound segments or controlled directly by the microprocessor 104 according to an group game play mode, i.e., a game play mode in which the player at one of the gaming units 20, 30 competes with or against other players at other gaming units 20, 30.

The light patterns displayed on the light array 90 may be synchronized to the events other than or in addition to the sound segments generated, such as, for example, the movement of display devices or images generated on display devices. For instance, a spinning wheel or reel may be included as an element of normal game play or bonus game play. The light array 90, which may include bezels, lights in top boxes, and backlit switches, may be illuminated in a pattern to "follow" the movement of the wheel or reel. When the wheel or reel stops, a starburst pattern may be displayed. This light pattern may be further synchronized with sounds and music played at the same time, or not. Thus, a visual connection may be formed between the light array 90 and the game itself.

If a potential player makes any input to the gaming unit 20 as determined at block 204, the attraction sequence may be terminated and a game-selection display may be generated on the display unit 70 at block 206 to allow the player to select a game available on the gaming unit 20. The gaming unit 20 may detect an input at block 204 in various ways. For example, the gaming unit 20 could detect if the player presses any button on the gaming unit 20; the gaming unit 20 could determine if the player deposited one or more coins into the gaming unit 20; the gaming unit 20 could determine if player deposited paper currency into the gaming unit; etc.

The game-selection display generated at block 206 may include, for example, a list of video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 208, the controller 100 may cause one of a number of game routines to be performed to allow the selected game to be played. For example, the game routines could include a video poker routine 210, a video blackjack routine 220, a slots routine 230, a video keno routine 240, and a video bingo routine 250. At block 208, if no game selection is made within a given period of time, the operation may branch back to block 202.

As noted above, the light array 90 may be synchronized to sound segments or controlled directly by the microprocessor 104 according to the new game play mode, i.e., normal play mode. However, the sound segments and light patterns used during the normal play mode may be different than those used with the attraction mode, and may be different than those used with the other game play modes described below. As one such example, during normal play mode of a video poker game, the "Hold" pushbutton may be backlit when actuated to annunciate the game play option. In such a circumstance, it may be confusing if the "Hold" pushbutton is also backlit as part of the sound segments and light pattern for the normal play mode. By contrast, backlighting the "Hold" pushbutton as part of the sound segments and light pattern may be perfectly acceptable during attraction mode, when the "Hold" pushbutton may not be normally actuated and thus not normally backlit.

As is explained in greater detail below with reference to the slots routine 230, each of the routines 210, 220, 230, 240, 250 may include bonus play. The bonus play mode may be initiated because of a particular event occurring during the normal play mode. For example, while many game outcomes (e.g., represented by particular slot symbol combinations, playing card combinations, etc.) may result in a payout being awarded, particular game outcomes or particular symbols or cards appearing in a game outcome may also cause the controller 100 to initiate the bonus play mode. Alternatively, the bonus play mode may be initiated randomly, or according to an algorithm. During the bonus play mode, the player may be permitted to play a further game that may have a higher likelihood of a game outcome resulting in a payout, larger payout amounts than during normal play, etc.

As was the case for the attraction mode and the normal play mode, the light array 90 may be synchronized to sound segments or controlled directly by the microprocessor 104 to cause sound segments and light patterns to be generated during the bonus play mode. The sound segments and light patterns generated during the bonus play mode may be different than the sound segments and light patterns generated during the normal play mode to alert other players and other people in the area to the fact that the particular player has achieved a game outcome that initiated the bonus play mode. The other comments made above regarding the operation of the audio output devices 86 and light array 90 in the context of the attraction mode and normal play mode may also be applicable regarding operation of the audio output devices 86 and light array 90 during the bonus play mode.

Additionally, certain game outcomes may lead to large payouts. Because of their size, these payouts may typically be awarded in only a limited number of cases. During this game play mode, which may be referred to as a jackpot mode, it may be desirable to alert other players to the fact that a large payout amount has been awarded. Additional sound segments and light patterns may be used that are not used during the attraction mode, the normal play mode, and the bonus play mode.

It may also be the case that certain of the gaming units 20, 30 are arranged with other gaming units 20, 30 into groups that may or may not be coextensive with the networks 12, 26 described above. The gaming units 20, 30 in each of the groups may be placed together in a particular area of a casino, for example, or may be members of a LAN, WAN or Wide Area Progressive (WAP). The gaming units 20, 30 of one of such groups may be programmed to participate in a game (see FIG. 18) in which some or all of the gaming units 20, 30 participate during which time the gaming units 20, 30 may still participate in the games (poker, blackjack, slots, keno, bingo) being played at the individual gaming units 20, 30. For example, all of the gaming units 20, 30 in a group, only those gaming units 20, 30 in present use, or only those gaming units 20, 30 where the player has wagered a specific amount may participate. During the group game play mode, which also may be referred to as a fever game mode, the audio output devices 86 and light arrays 90 may be used as part of or in accordance with the fever game mode.

After one of the routines 210, 220, 230, 240, 250 has been performed to allow the player to play one of the games (and, optionally, one of the bonus games), block 260 may be utilized to determine whether the player wishes to terminate play on the gaming unit 20 or to select another game. If the player wishes to stop playing the gaming unit 20, which wish may be expressed, for example, by selecting a "Cash Out" button, the controller 100 may dispense value to the player at block 262 based on the outcome of the game(s) played by the player. The operation may then return to block 202. If the player did not wish to quit as determined at block 260, the routine may return to block 208 where the game-selection display may again be generated to allow the player to select another game.

It should be noted that although five gaming routines are shown in FIG. 4, a different number of routines could be included to allow play of a different number of games. The gaming unit 20 may also be programmed to allow play of different games.

Figure 5:
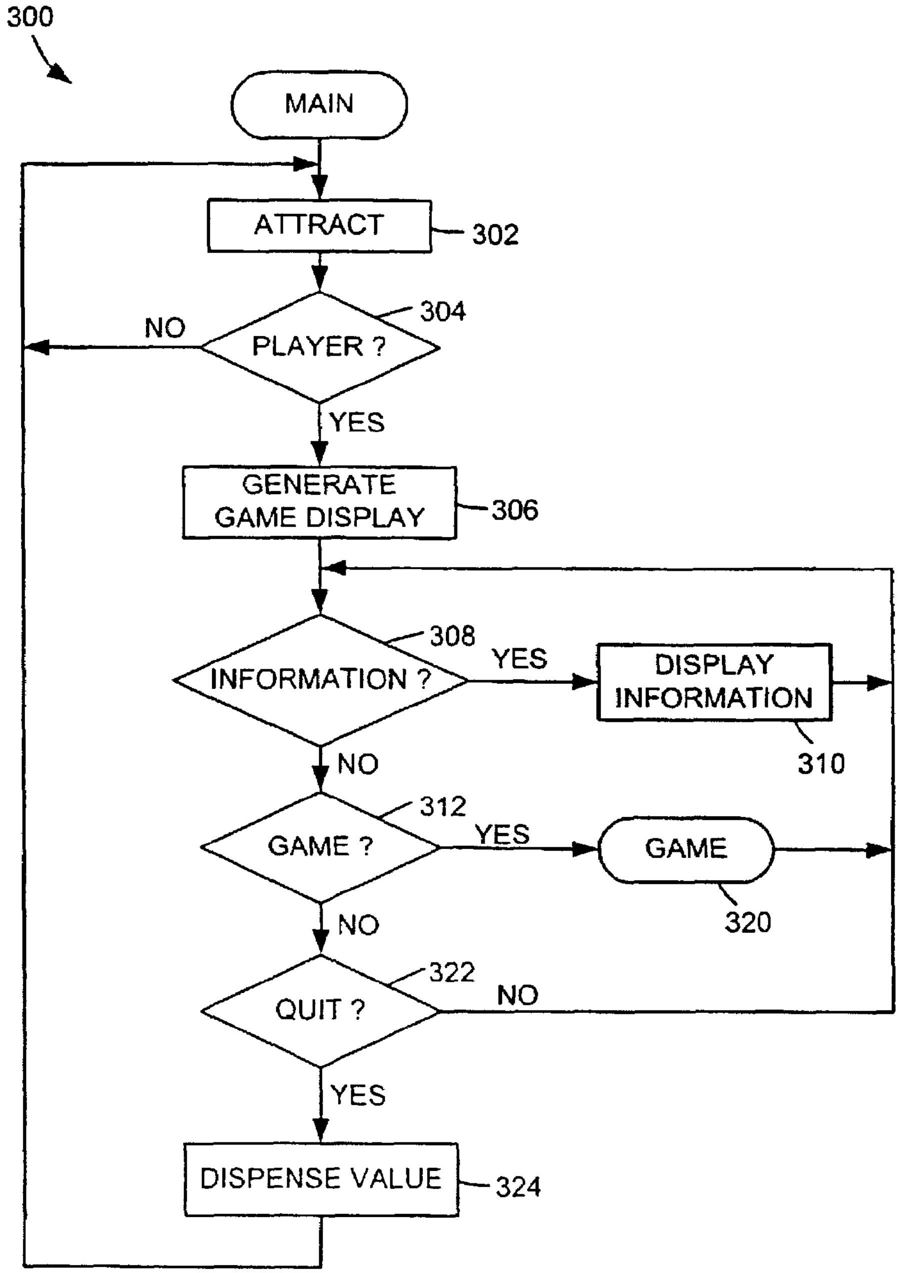
FIG. 5 is a flowchart of an alternative embodiment of a main routine that may be performed during operation of one or more of the gaming units.

FIG. 5 is a flowchart of an alternative main operating routine 300 that may be stored in the memory of the controller 100. The main routine 300 may be utilized for gaming units 20 that are designed to allow play of only a single game or single type of game. Referring to FIG. 5, the main routine 300 may begin operation at block 302 during which an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the audio output devices 86.

During performance of the attraction sequence, if a potential player makes any input to the gaming unit 20 as determined at block 304, the attraction sequence may be terminated and a game display may be generated on the display unit 70 at block 306. The game display generated at block 306 may include, for example, an image of the casino game that may be played on the gaming unit 20 and/or a visual message to prompt the player to deposit value into the gaming unit 20. At block 308, the gaming unit 20 may determine if the player requested information concerning the game, in which case the requested information may be displayed at block 310. Block 312 may be used to determine if the player requested initiation of a game, in which case a game routine 320 may be performed. The game routine 320 could be any one of the game routines disclosed herein, such as one of the five game routines 210, 220, 230, 240, 250, or another game routine. The routine 300 may also include the optional fever game that may be played during the game routine 320.

After the routine 320 has been performed to allow the player to play the game, block 322 may be utilized to determine whether the player wishes to terminate play on the gaming unit 20. If the player wishes to stop playing the gaming unit 20, which wish may be expressed, for example, by selecting a "Cash Out" button, the controller 100 may dispense value to the player at block 324 based on the outcome of the game(s) played by the player. The operation may then return to block 302. If the player did not wish to quit as determined at block 322, the operation may return to block 308.

Video Poker

Figure 6:
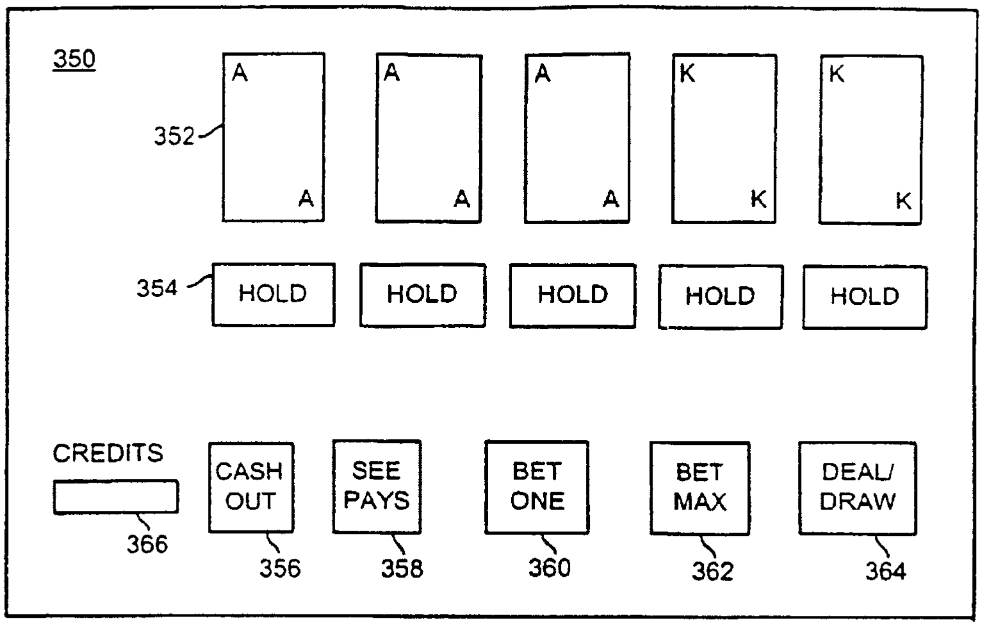
FIG. 6 is an illustration of an embodiment of a visual display that may be displayed during performance of the video poker routine of FIG. 8.

FIG. 6 is an exemplary display 350 that may be shown on the display unit 70 during performance of the video poker routine 210 shown schematically in FIG. 4. Referring to FIG. 6, the display 350 may include video images 352 of a plurality of playing cards representing the player's hand, such as five cards. To allow the player to control the play of the video poker game, a plurality of player-selectable buttons may be displayed. The buttons may include a "Hold" button 354 disposed directly below each of the playing card images 352, a "Cash Out" button 356, a "See Pays" button 358, a "Bet One Credit" button 360, a "Bet Max Credits" button 362, and a "Deal/Draw" button 364. The display 350 may also include an area 366 in which the number of remaining credits or value is displayed. If the display unit 70 is provided with a touch-sensitive screen, the buttons 354, 356, 358, 360, 362, 364 may form part of the video display 350. Alternatively, one or more of those buttons may be provided as part of a control panel that is provided separately from the display unit 70.

Figure 8:
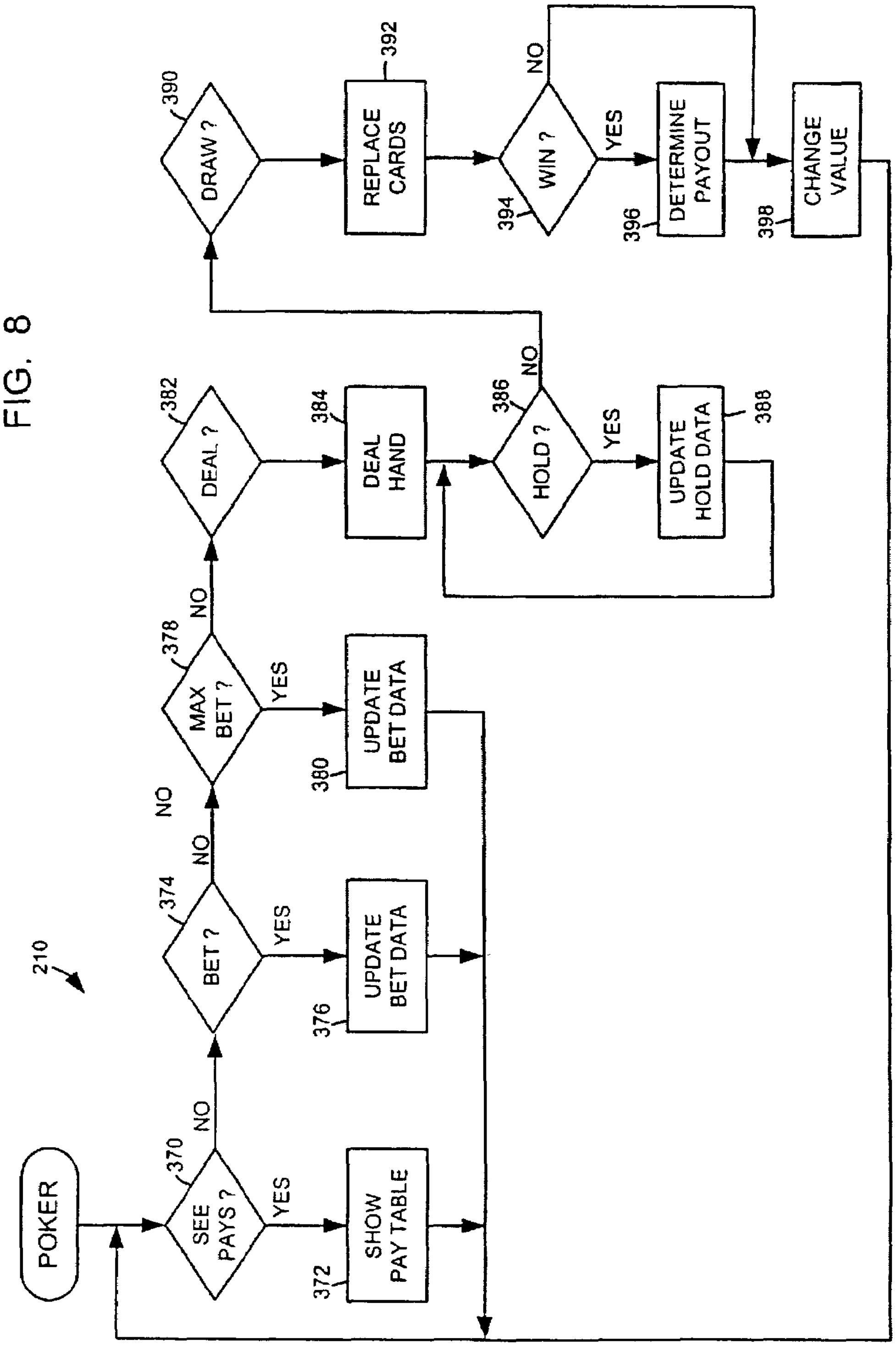
FIG. 8 is a flowchart of an embodiment of a video poker routine that may be performed by one or more of the gaming units.

FIG. 8 is a flowchart of the video poker routine 210 shown schematically in FIG. 4. Referring to FIG. 8, at block 370, the routine may determine whether the player has requested payout information, such as by activating the "See Pays" button 358, in which case at block 372 the routine may cause one or more pay tables to be displayed on the display unit 70. At block 374, the routine may determine whether the player has made a bet, such as by pressing the "Bet One Credit" button 360, in which case at block 376 bet data corresponding to the bet made by the player may be stored in the memory of the controller 100. At block 378, the routine may determine whether the player has pressed the "Bet Max Credits" button 362, in which case at block 380 bet data corresponding to the maximum allowable bet may be stored in the memory of the controller 100.

At block 382, the routine may determine if the player desires a new hand to be dealt, which may be determined by detecting if the "Deal/Draw" button 364 was activated after a wager was made. In that case, at block 384 a video poker hand may be "dealt" by causing the display unit 70 to generate the playing card images 352. After the hand is dealt, at block 386 the routine may determine if any of the "Hold" buttons 354 have been activated by the player, in which case data regarding which of the playing card images 352 are to be "held" may be stored in the controller 100 at block 388. If the "Deal/Draw" button 364 is activated again as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 6).

Although the video poker routine 210 is described above in connection with a single poker hand of five cards, the routine 210 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Video Blackjack

Figure 7:
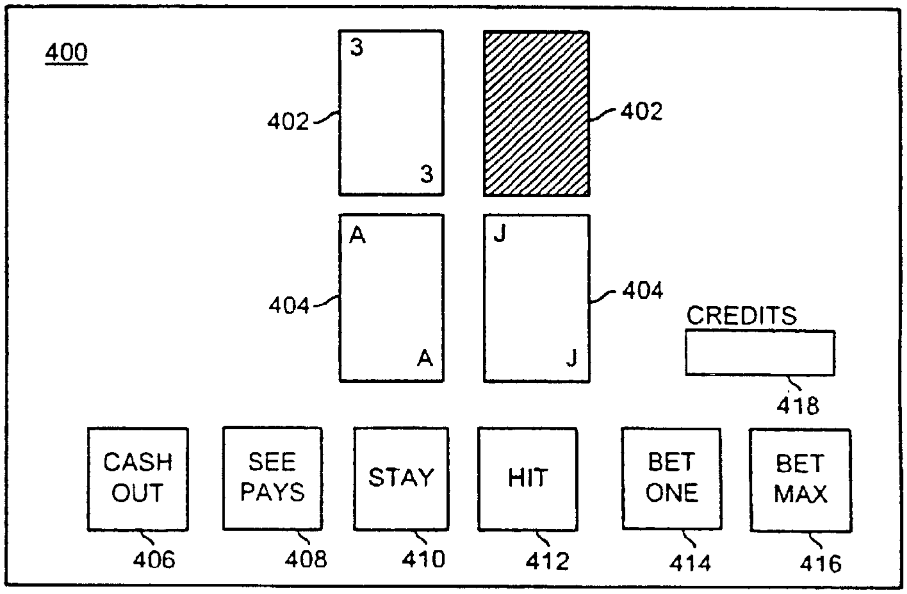
FIG. 7 is an illustration of an embodiment of a visual display that may be displayed during performance of the video blackjack routine of FIG. 9.

FIG. 7 is an exemplary display 400 that may be shown on the display unit 70 during performance of the video blackjack routine 220 shown schematically in FIG. 4. Referring to FIG. 7, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the display unit 70 is provided with a touch-sensitive screen, the buttons 406, 408, 410, 412, 414, 416 may form part of the video display 400 Alternatively, one or more of those buttons may be provided as part of a control panel that is provided separately from the display unit 70.

Figure 9:
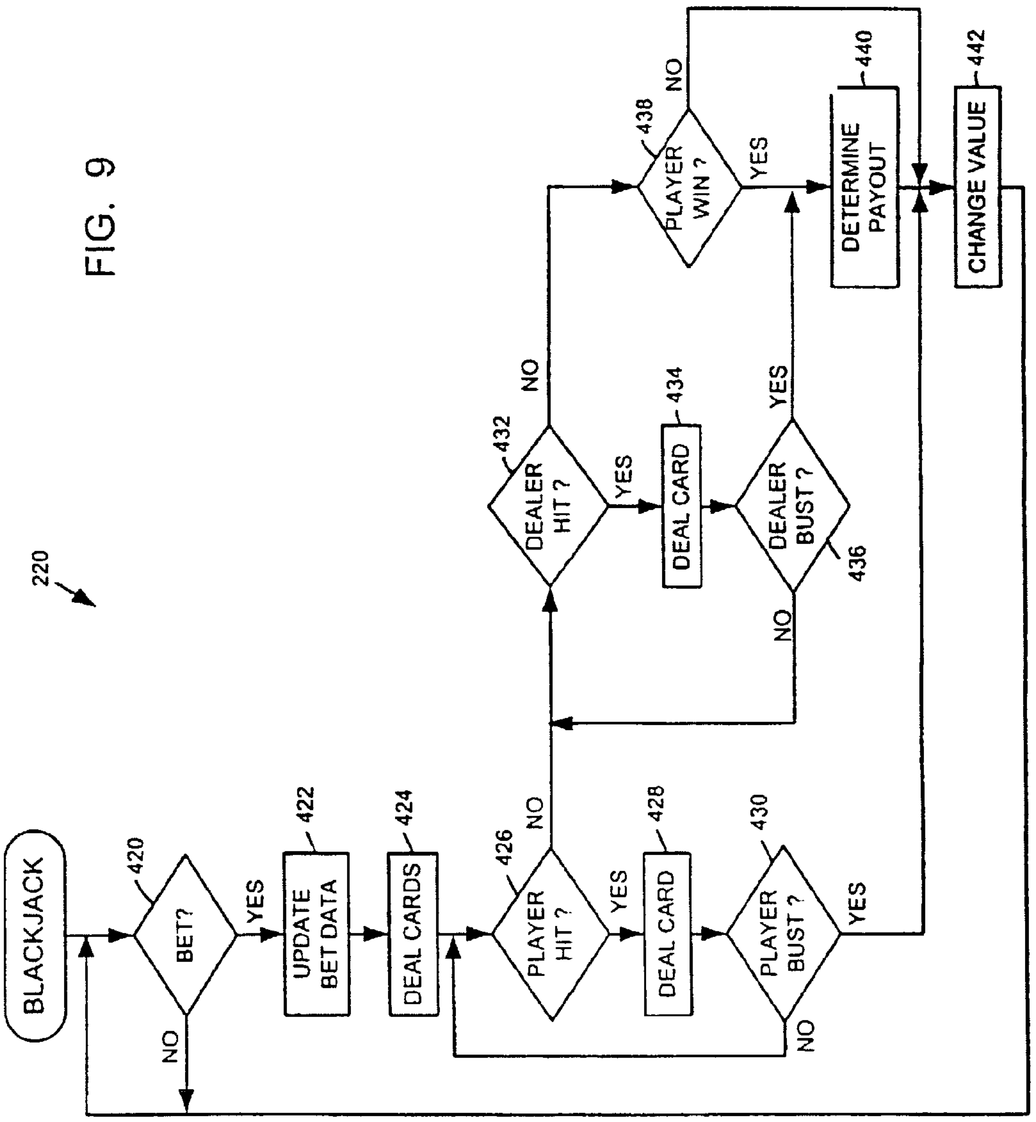
FIG. 9 is a flowchart of an embodiment of a video blackjack routine that may be performed by one or more of the gaming units.

FIG. 9 is a flowchart of the video blackjack routine 220 shown schematically in FIG. 4. Referring to FIG. 9, the video blackjack routine 220 may begin at block 420 where it may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of the controller 100. At block 424, a dealer's hand and a player's hand may be "dealt" by making the playing card images 402, 404 appear on the display unit 70.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not busted, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 440. The cumulative value or number of credits may also be displayed in the display area 418 (FIG. 7).

Slots

FIG. 10 is an exemplary display 450 that may be shown on the display unit 70 during performance of the slots routine 230 shown schematically in FIG. 4. Referring to FIG. 10, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 12:
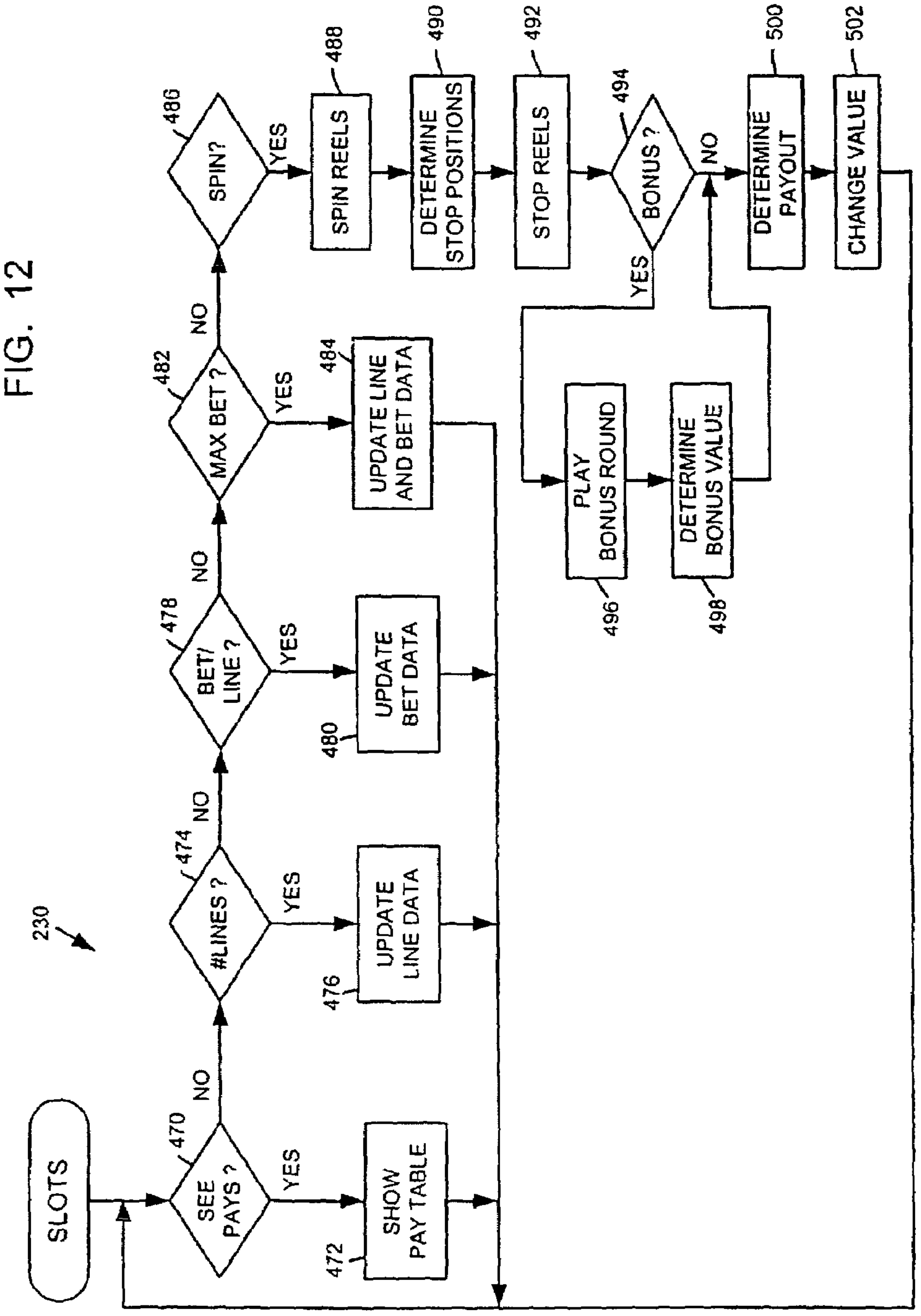
FIG. 12 is a flowchart of an embodiment of a slots routine that may be performed by one or more of the gaming units.

FIG. 12 is a flowchart of the slots routine 230 shown schematically in FIG. 10. Referring to FIG. 12, at block 470, the routine may determine whether the player has requested payout information, such as by activating the "See Pays" button 458, in which case at block 472 the routine may cause one or more pay tables to be displayed on the display unit 70. At block 474, the routine may determine whether the player has pressed one of the payline-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per payline may be stored in the memory of the controller 100. At block 482, the routine may determine whether the player has pressed the "Max Bet" button 466, in which case at block 484 bet data (which may include both payline data and bet-per-payline data) corresponding to the maximum allowable bet may be stored in the memory of the controller 100.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the display unit 70, actual slot machine reels that are capable of being spun may be utilized instead.

Video Keno

FIG. 11 is an exemplary display 520 that may be shown on the display unit 70 during performance of the video keno routine 240 shown schematically in FIG. 4. Referring to FIG. 11, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the display unit 70 is provided with a touch-sensitive screen, the buttons may form part of the video display 520. Alternatively, one or more of those buttons may be provided as part of a control panel that is provided separately from the display unit 70.

Figure 13:
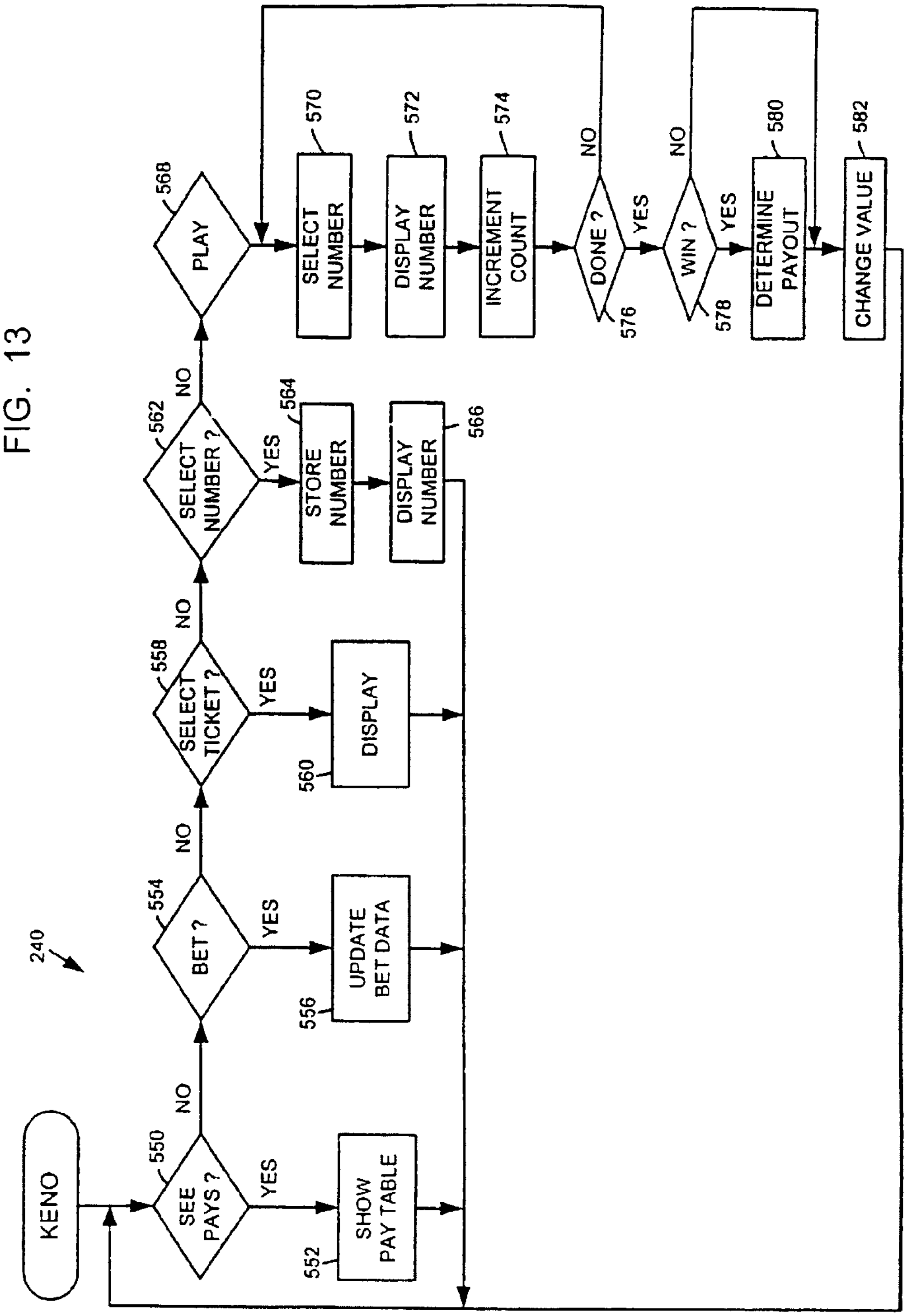
FIG. 13 is a flowchart of an embodiment of a video keno routine that may be performed by one or more of the gaming units.

FIG. 13 is a flowchart of the video keno routine 240 shown schematically in FIG. 4. The keno routine 240 may be utilized in connection with a single gaming unit 20 where a single player is playing a keno game, or the keno routine 240 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 13, at block 550, the routine may determine whether the player has requested payout information, such as by activating the "See Pays" button 528, in which case at block 552 the routine may cause one or more pay tables to be displayed on the display unit 70. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the casino may be randomly selected either by the controller 100 or a central computer operatively connected to the controller, such as one of the network computers 22, 32. At block 572, the randomly selected game number may be displayed on the display unit 70 and the display units 70 of other gaming units 20 (if any) which are involved in the same keno game. At block 574, the controller 100 (or the central computer noted above) may increment a count that keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 11).

Video Bingo

Figure 14:
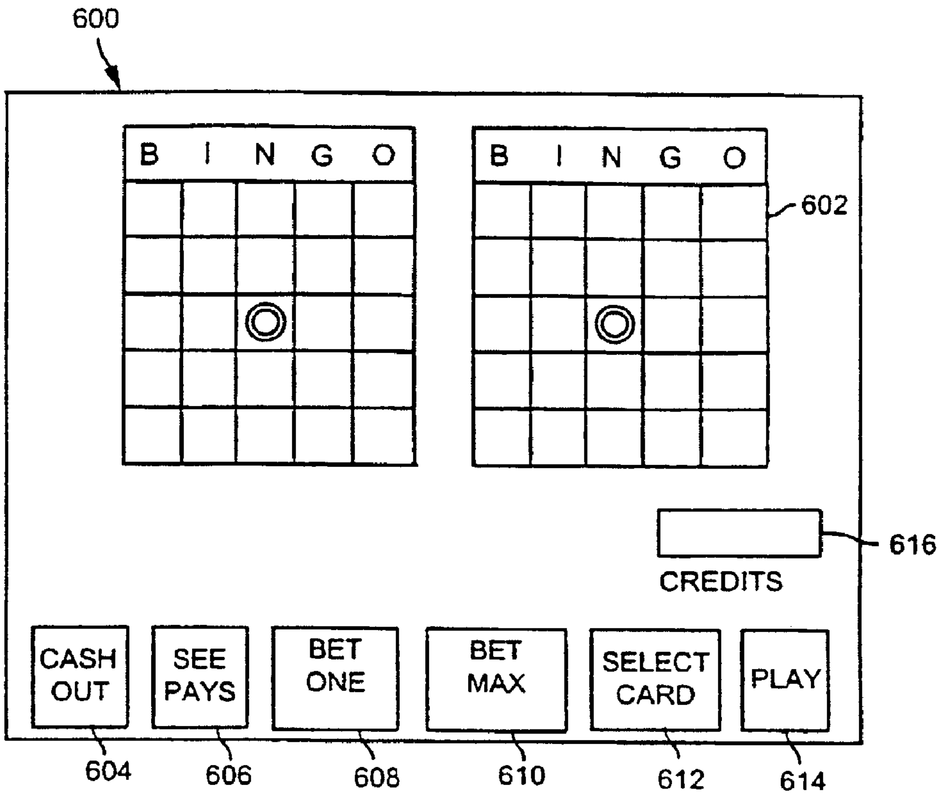
FIG. 14 is an illustration of an embodiment of a visual display that may be displayed during performance of the video bingo routine of FIG. 15.

FIG. 14 is an exemplary display 600 that may be shown on the display unit 70 during performance of the video bingo routine 250 shown schematically in FIG. 4. Referring to FIG. 14, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displaced. If the display unit 70 is provided with a touch-sensitive screen, the buttons may form part of the video display 600. Alternatively, one or more of those buttons may be provided as part of a control panel that is provided separately from the display unit 70.

Figure 15:
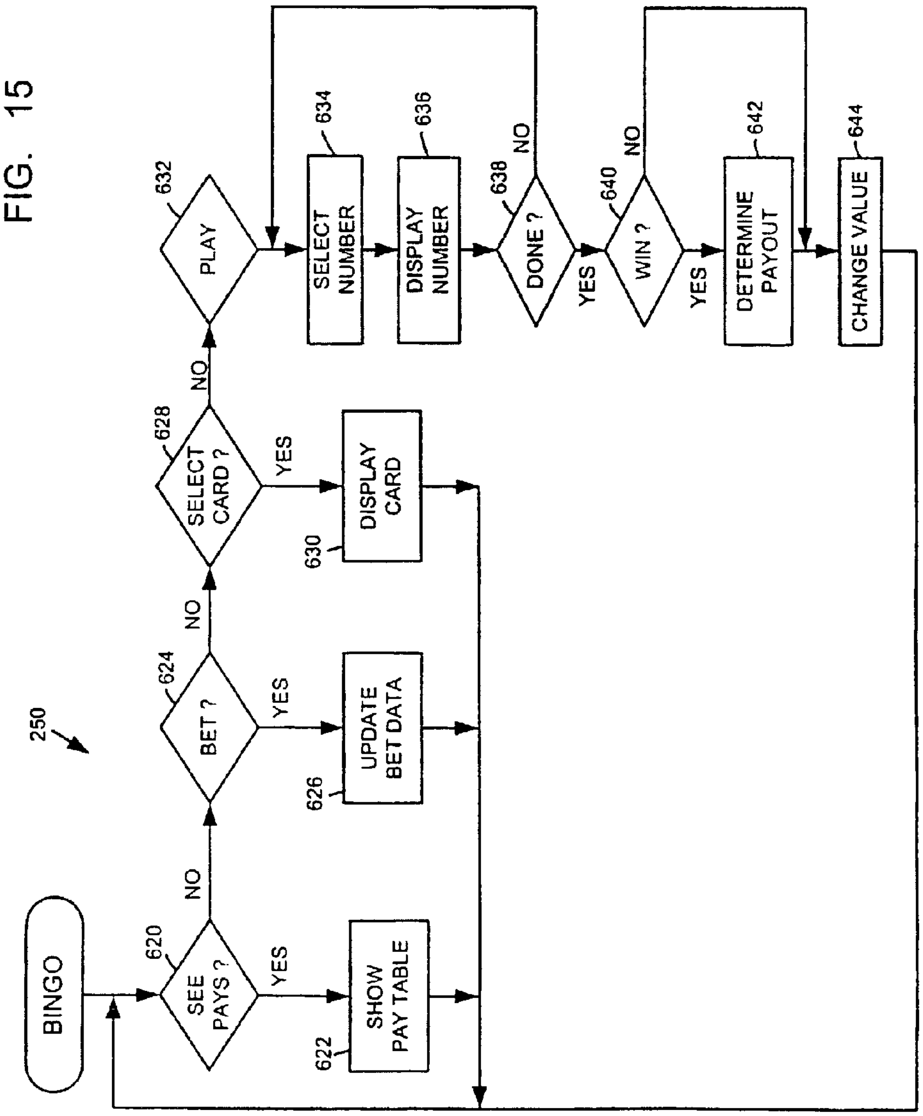
FIG. 15 is a flowchart of an embodiment of a video bingo routine that may be performed by one or more of the gaming units.
Figure 16:
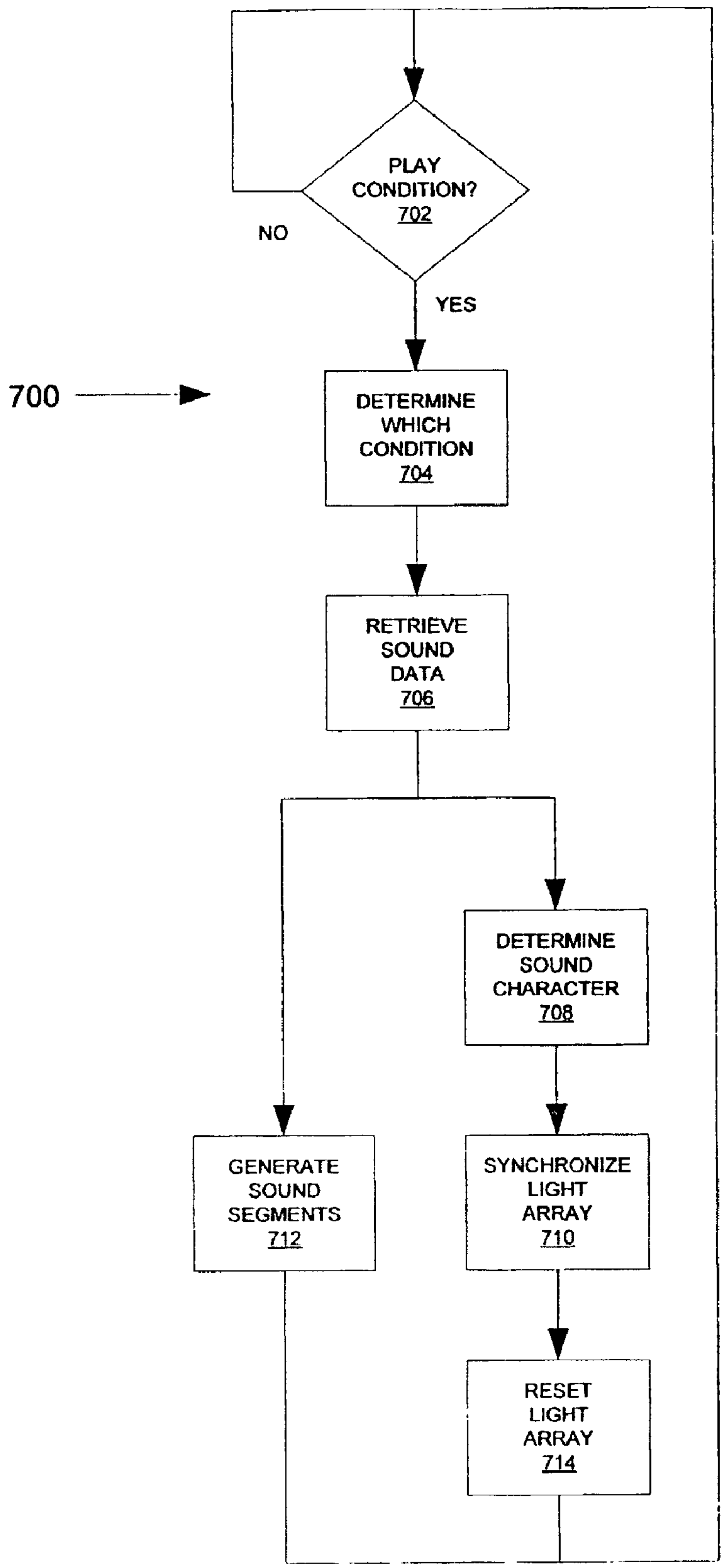
FIG. 16 is a flowchart of an embodiment of a routine for providing audio and video stimulations.

FIG. 15 is a flowchart of the video bingo routine 250 shown schematically in FIG. 4. The bingo routine 250 may be utilized in connection with a single gaming unit 20 where a single player is playing a bingo game, or the bingo routine 250 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 15, at block 620, the routine may determine whether the player has requested payout information, such as by activating the "See Pays" button 606, in which case at block 622 the routine may cause one or more pay tables to be displayed on the display unit 70. At block 624, the routine may determine whether the player has made a bet, such as by having pressed the "Bet One Credit" button 608 or the "Bet Max Credits" button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the display unit 70 and the display units 70 of any other gaming units 20 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 14).

Stimulation Routine

As stated above, the controller 100 of the gaming unit 20, 30, in combination with or apart from the network computers 22, 32, may cause the audio output devices 86 to generate audio sound segments (sound effects, voices, music, etc.) and the light array 90 to generate light patterns. As also stated above, the operation of the light array 90 may be synchronized with the sound segments or controlled directly by the microprocessor 104. As further stated, the sound segments and light patterns may or may not be performed in accordance with a game play mode.

The following is an example of an overall stimulation routine 700 that may be used to synchronize sound segments generated by the audio output devices 86 and the light patterns generated by the light array 90. The stimulation routine 700 may begin at block 702. At block 702, the controller 100 may determine if a game play mode has occurred for which synchronized sound segments and light patterns are to be generated. If the controller 100 determines that no such game play mode exists, then the routine 700 may remain at block 702. If the controller 100 determines that such a game play mode exists (e.g., one of the attraction mode, the normal game play mode, the bonus play mode, the jackpot mode and the fever play mode), then the routine 700 may proceed to block 704. At block 704, a determination may be made as to which game play mode exists.

At block 706, the controller 100 may retrieve a sound file from memory, for example the program memory 102, in accordance with the game play mode. The sound file may contain music and other sound effects, such as the sound of spinning reels or bells and whistles, for example. The sound file may be in the Windows (.wav) format, although other formats may also be used.

At block 708, characteristics of the sound segments may be determined. For example, the sound segments may be filtered using the filter array 120 into a series of frequency bands. The average peak data value for each frequency band may be determined using the peak detector 122. This information may be provided to the controller 100.

Given the sound file characteristics determined at block 708, the controller 100 may retrieve at block 710 light pattern data in accordance with the sound file characteristics. According to example given above, wherein average peak data values are determined, the retrieval in block 710 may include retrieval of light pattern data for each average peak data value determined. For example, the light pattern data may be stored in the program memory 102 in the form of a data table. The light pattern data may represent a pattern (such as on/off, dimmed, starburst, banded, striped, worm, etc.) and/or a color (where the light array 90 is capable of providing more than one color).

Also at block 710, the light pattern data may be converted into instructions to be used by the light array to provide the appropriate light pattern data and color. Similarly, the sound data retrieved at block 706 may be transmitted to the sound circuit 112, which converts the sound data into instructions to be used by the audio output device 86 to provide the appropriate music and/or sound effects at block 712. At block 714, the controller 100 may reset the audio output devices 86 and light array 90 after an event occurs (e.g. certain time elapses) to await the next game play mode determination.

As an alternative, the light patterns may not be synchronized to the sound segments as discussed above. That is, rather than using characteristics of the sound segments to select the patterns and timings of the light patterns generated, the controller 104 may control the generation of the sound segments and the light patterns directly By operating in this fashion, the light array 90 may be controlled to provide light patterns when there is no sound segment being generated by the audio output devices 86, for example before the sound segment starts or after the sound segment ends.

Figure 17:
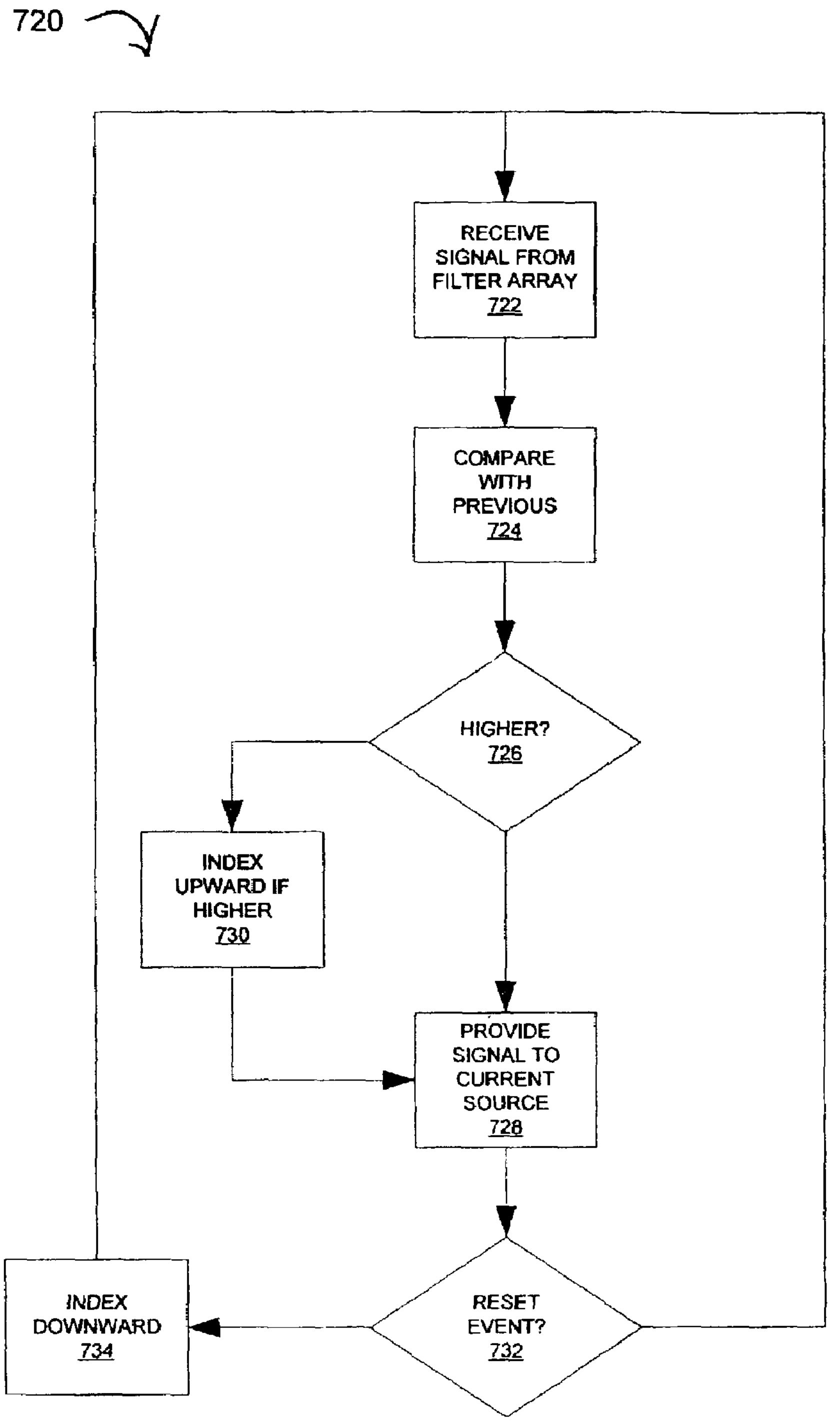
FIG. 17 is a flowchart of an embodiment of a method of operating the electrical components of FIG. 3A.

FIG. 17 shows the operation of the components shown in FIG. 3A for carrying out the overall stimulation routine 700. While the discussion below focuses on the operation of the peak detector 122 and current source 124 to control a light array 90 including an LED in response to the characteristics of a single frequency band, it will be recognized that the operation may be generalized to multiple LEDs or the like and multiple frequency bands.

As indicated at block 722, a signal may be received from the filter array 120 at the negative input to the comparator 132 via the resistor 140 and the diodes 142, 144. The diodes 142, 144 may be connected to the negative input to keep the input voltage from the filter array 120 from exceeding the input common mode voltage of the comparator 132. Assuming that the LED is to be illuminated at this time, the microprocessor 104 may provide a signal at pin 1 of the digital potentiometer 130 to place the digital potentiometer 130 in the up count mode.

The microprocessor 104 may monitor the output of the comparator 132 at the block 724 to compare the input voltage on the negative input of the comparator 132 with the voltage from the digital potentiometer 130 at the positive input of the comparator 132. If the input voltage on the negative input is more positive than the voltage on the positive input, as determined at block 726, the microprocessor 104 may enable the digital potentiometer 130 to advance its count at block 728 until the voltage from the digital potentiometer 130 is greater than the voltage from the filter array 120 at the negative input of the comparator 132. Thus, the output at pin 5 of the potentiometer 130 may be held at the peak value of the voltage from the filter array 120, as indicated at block 726.

In either eventuality, the output from the peak detector 122 may be passed to the current source 124 at block 730, which in this case may be a constant current source formed by the operational amplifier 146, the transistors 148, 150 and the resistors 152, 154, 156. The collector of the transistor 150 may be coupled to the cathode of an LED (not shown), which has its anode coupled to a positive voltage source. The current of the current source 124 may be controlled according to the voltage on the non-inverting terminal of the operational amplifier 146. The voltage at the non-inverting terminal of the operational amplifier 146 may also appear across the resistor 154. Because the bases of the transistors 148, 150 may be coupled together, the voltage across the resistor 154 may also appear across the resistor 156. The transistor 150 may thus source current through the resistor 156 into the LED that may be coupled at the output of the constant current source 124.

As seen at block 732 in FIG. 17, the microprocessor 104 may await an event to decrease or extinguish the illumination of the light array 90. The event may be a certain time duration, for example. During the time in which the event does not occur, the routine 720 may return to the block 722. When the event occurs, the routine 720 may pass to block 734. At block 734, the microprocessor 104 may change the count input to the digital potentiometer 130 from counting up to counting down. The microprocessor 104 may then clock the digital potentiometer 130 at least 32 times. This clocking in the down count mode may cause the digital potentiometer 130 to have an output voltage at 0 volts. This output voltage then may be passed to the current source 124 turning it off, which causes the light array 90 to be turned off. At this point, the routine 720 may return to block 722 at which point the routine 720 may start over.

Alternatively, it is not necessary for the microprocessor 104 to permit the light array 90 to be controlled according to the input from the filter array 120. Instead, the microprocessor 104 may control the light array 90 directly. Because the output of the comparator 132 passes to the microprocessor 104 before being passed along to the digital potentiometer 130, the microprocessor 104 may selectively pass only those signal it chooses to pass. Consequently, if the microprocessor 104 determines that it does not wish to utilize output of the comparator 132 (and thus the output from the filter array 120), the microprocessor 104 may control the light array 90 directly.

For example, if the microprocessor 104 wants the intensity of the light array 90 to be full bright, it may send a count of 31 to the digital potentiometer 130. In turn, the digital potentiometer 130 may drive the current source 124 to full on, which causes the light array 90 to be fully illuminated. By contrast, if the microprocessor clocks the digital potentiometer to a value of 15, the light array 90 may be at half bright. As a further alternative, the microprocessor 104 may have a series of scripts that it may play on command. These scripts may be stored inside the program memory 102, and may run for a given time. The scripts may be chained together to form longer scripts that may be synchronized to the play of the gaming unit 20, 30.

Fever Play Routine

Figure 18:
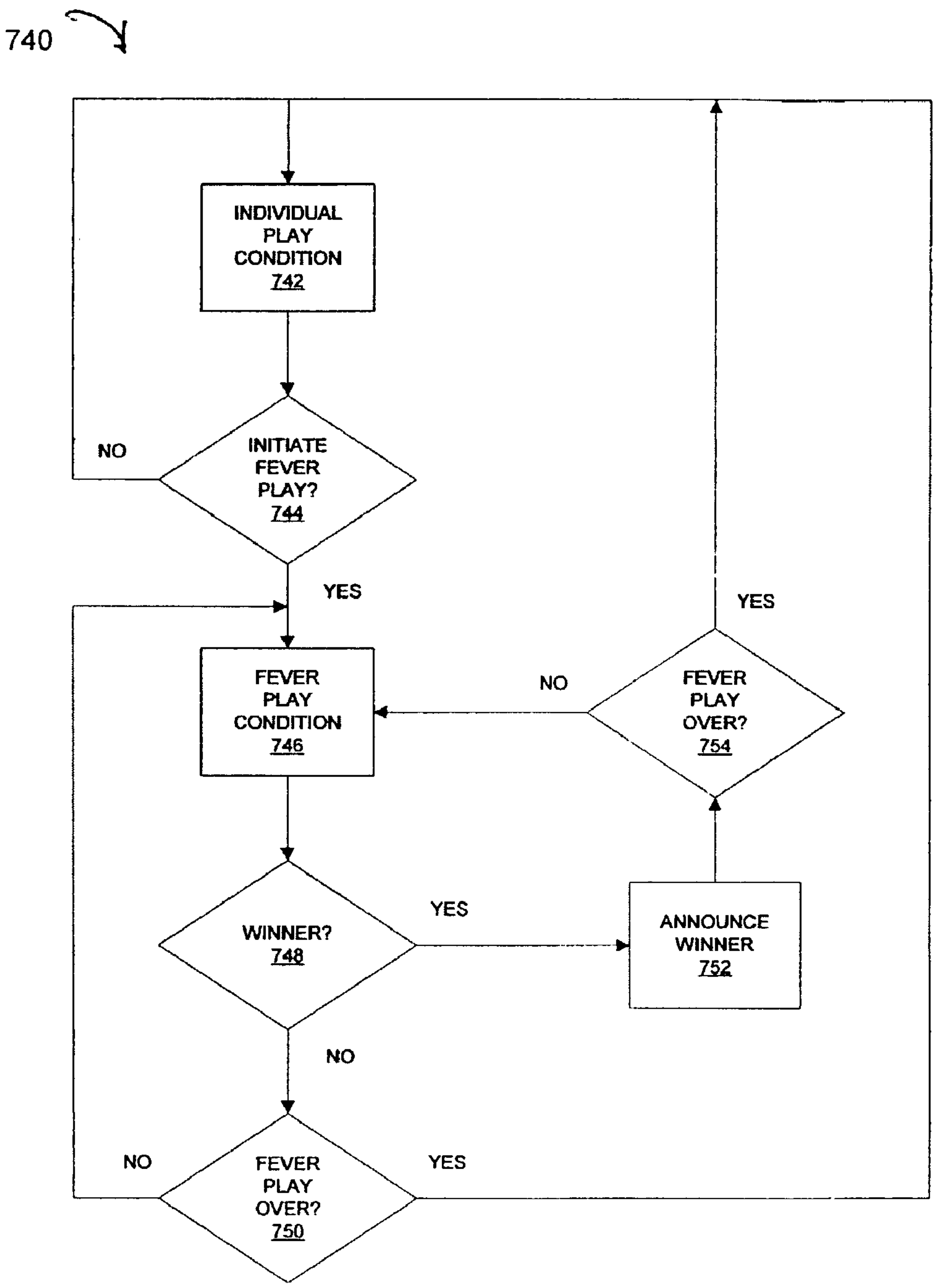
FIG. 18 is a flowchart of an embodiment of a group game play routine that may include audio and video stimulations.

FIG. 18 shows an embodiment of a routine 740 that may be used in a form of game play that involves a group of gaming units 20, 30. The routine 740 may start at block 742, wherein the gaming unit 20, 30 operates according to an individual mode of play. At block 744, a determination may be made as to whether a mode of play involving a group of gaming units 20, 30 has been initiated. If the group play mode has not been initiated, the routine 740 may branch back to block 742. If the group play mode has been initiated, then the routine 740 may pass to block 746.

The group game, represented by the block 746, may be played until a single winner is determined. Alternatively, the group game may be played until a specific time has elapsed or a specific amount of value has been awarded, in which case more than one winner may be determined. The determination may occur based on a random assignment or according to an algorithm. The algorithm may take into account, for example, the success of the player relative to the game being played in the individual mode of play. Alternatively, it may be based on the collective success of the members of the group.

During this fever play mode, the controller 100 of the gaming units 20, 30 involved in the fever play mode may be operated as described above with reference to an embodiment of the stimulation routine 700. That is, according to an embodiment, a central computer, such as the network computer 22, 32, may be used to coordinate the sound segments and light patterns of the individual gaming units 20, 30 to indicate that the fever play mode has been initiated, using timers, for instance. For example, the network computer 22, 32 may initiate a starburst pattern at each of the individual gaming units 20, 30 in the group in turn to show the players that the fever play mode has been initiated. Alternatively, one of the gaming units 20, 30 may control and synchronize the operation of the individual gaming units 20, 30.

At block 748, the network computer 22, 32, for example, may determine if a winner has been determined. If no winner has been determined, as determined at block 748, then a further determination may be made at block 750 as to whether a further condition has been met (e.g., the time has elapsed for the fever play mode). If the further condition has not been met, the routine 740 may branch back to block 746; otherwise, the routine 740 may branch back to block 742.

If a winner has been determined, as determined at block 748, an indication may be provided to member gaming units 20, 30 of the group of gaming units 20, 30 at block 752. A further determination may be made at block 754 as to whether a further condition has been met (e.g. the time has elapsed for the fever play mode). If the further condition has not been met, the routine may branch to block 746; otherwise the routine 740 may branch back to block 742.

Alternative forms of the fever play may be possible. For example, the status of the players at the individual member gaming units 20, 30 of the group may influence the size of the payouts. For instance, a multiplier may be used for certain member gaming units 20, 30 of the group, or special odds may be used for certain member gaming units 20, 30 increasing the likelihood that players at those member gaming units 20, 30 will be winners. Additionally, a winner or winners may progress from the initial level of fever play to additional levels of fever play.

What is claimed is:

1. A gaming apparatus, comprising:

a value input device;

a display unit that is capable of generating video images;

a light array;

an audio output device;

a plurality of filters;

a plurality of peak detectors, each of the plurality of peak detectors operatively coupled to one of the filters of the plurality of filters and providing a peak for a band of the segment filtered by the associated filter and each of the plurality of peak detectors comprising:

a comparator having first and second inputs, the first input operatively coupled to one of the plurality of filters, and an output operatively coupled to the controller and a digital potentiometer having at least one input operatively coupled to the controller and an output coupled to the second input of the comparator;

a current source operatively coupled to the light array; and a controller operatively coupled to said value input device, said display unit, said light array, said plurality of peak detectors, said current source, and said audio output device, said controller comprising a processor and a memory operatively coupled to said processor, said controller being programmed to allow a person to make a wager, said controller being programmed to cause a video image representing a game to be generated on said display unit, said video image representing one of the following games:

video poker, video blackjack, video slots, video keno or video bingo, said video image comprising an image of at least five playing cards if said game comprises video poker, said video image comprising an image of a plurality of simulated slot machine reels if said game comprises video slots, said video image comprising an image of a plurality of playing cards if said game comprises video blackjack, said video image comprising an image of a plurality of keno numbers if said game comprises video keno, said video image comprising an image of a bingo grid if said game comprises video bingo;

said controller being programmed to determine a game event mode;

said controller being programmed to selectively perform one of: (i) to cause a sound segment to be generated on said audio output device and synchronize a light pattern to be generated on said light array with the sound segment and (ii) to control said light array directly to cause a light pattern to be generated on said light array according to the game event mode; and the controller being programmed to receive the peaks from the plurality of peak detectors and to control the current source to cause a light pattern to be generated on said light array according to the peaks received; and said controller being programmed to determined a value payout associated with an outcome of said game.

2. A gaming apparatus as defined in claim 1, wherein the output from the digital potentiometer is coupled to the input of the current source.

* * * * *